(12) United States Patent
Kurihara et al.

(10) Patent No.: US 6,335,780 B1
(45) Date of Patent: Jan. 1, 2002

(54) LCD WITH PROTRUSION STRUCTURES FOR AXIALLY SYMMETRICALLY ALIGNING LIQUID CRYSTAL IN REGIONS SMALLER THAN 70 μM×70 μM

(75) Inventors: Takashi Kurihara, Nara; Yusuke Tsuda, Kyoto; Masato Imai, Tajimi, all of (JP)

(73) Assignees: Sharp Kabushiki Kaisha, Osaka; Sony Corporation, Tokyo, both of (JP)

( * ) Notice: Subject to any disclaimer, the term of this patent is extended or adjusted under 35 U.S.C. 154(b) by 0 days.

(21) Appl. No.: 09/357,380

(22) Filed: Jul. 20, 1999

(30) Foreign Application Priority Data

Aug. 5, 1998 (JP) ............................................ 10-222145

(51) Int. Cl.[7] ...................... G02F 1/1337; G02F 1/1339
(52) U.S. Cl. ...................................................... 349/156
(58) Field of Search ................................ 349/156, 123, 349/130, 191, 32

(56) References Cited

U.S. PATENT DOCUMENTS

| | | | | |
|---|---|---|---|---|
| 5,666,179 A | * | 9/1997 | Koma | 349/143 |
| 5,818,558 A | * | 10/1998 | Ogishima | 349/110 |
| 5,831,704 A | * | 11/1998 | Yamada et al. | 349/124 |
| 6,043,860 A | * | 3/2000 | Wei et al. | 349/187 |
| 6,140,988 A | * | 10/2000 | Yamada | 345/88 |
| 6,154,267 A | * | 11/2000 | Kondo et al. | 349/156 |

FOREIGN PATENT DOCUMENTS

| | | | |
|---|---|---|---|
| JP | 9-61794 A | | 3/1997 |
| JP | 9-68698 A | | 3/1997 |
| JP | 9-73084 A | | 3/1997 |
| JP | 10-186330 A | | 7/1998 |
| JP | 10-186331 A | * | 7/1998 |

* cited by examiner

*Primary Examiner*—Toan Ton
*Assistant Examiner*—Andrew Schechter
(74) *Attorney, Agent, or Firm*—Nixon & Vanderhye P.C.

(57) ABSTRACT

A liquid crystal display device includes a first substrate, a second substrate, and a liquid crystal layer interposed between the first and second substrates. The first substrate includes a protrusion structure and a vertical alignment layer each facing the liquid crystal layer. The liquid crystal layer includes a plurality of liquid crystal regions separated from each other by the protrusion structure. Liquid crystal molecules in the plurality of liquid crystal regions are aligned axially symmetrically around an axis perpendicular to a surface of the second substrate at least in the presence of applied voltage. Each of the plurality of liquid crystal regions has a size such that each of the plurality of liquid crystal regions is included within a circular area circumscribing a square of approximately 70 μm or less.

16 Claims, 9 Drawing Sheets

LCD WITH PROTRUSION STRUCTURES FOR AXIALLY SYMMETRICALLY ALIGNING LIQUID CRYSTAL IN REGIONS SMALLER THAN 70 μM×70 μM

BACKGROUND OF THE INVENTION

1. Field of the Invention

The present invention relates to a liquid crystal display device used as a display device for computers, audiovisual equipment and the like.

2. Description of the Related Art

Japanese Laid-Open Publication No. 10-186330 discloses a liquid crystal display device in which liquid crystal molecules are axially symmetrically aligned in each of pixel regions in the presence of applied voltage. Such a liquid crystal display device can provide a display with wide viewing angle characteristics and satisfactory contrast.

FIG. 6B is a top plan view of a liquid crystal display device 100 having the above-described structure. FIG. 6A is a partial cross-sectional view of the liquid crystal display device 100 taken along a line Y–Y' of FIG. 6B. In the liquid crystal display device 100, a transparent electrode 63 is formed on a substrate 62. A protrusion 66 approximately 3 μm high (liquid crystal molecule alignment limiting arrangement) is formed outside a plurality of pixel regions 69. Spacers 65 approximately 5 μm high are formed of photosensitive polyimide on the protrusion 66. A vertical alignment layer 68 is formed on the transparent electrode 63 so as to cover the protrusion 66 and the spacer 65 by spin-coating. The vertical alignment layer 68 is formed of JALS-204 (Japan Synthetic Rubber Co., Ltd.). Another vertical alignment layer 68 is formed of the same material on the other substrate (not shown).

The pixel regions 69 surrounded by the protrusion 66 each have a size of approximately 100 μm×100 μm. The liquid crystal molecules in a liquid crystal layer (not shown) are axially symmetrically aligned in each of the pixel regions 69 in the presence of applied voltage.

In the liquid crystal display device 100, an alignment fixing layer is provided by curing a photocurable resin, which has been previously mixed with a liquid crystal material, while applying a voltage in order to stabilize the axially symmetric alignment of the liquid crystal molecules. Acrylate resins, methacrylate resins, styrene resins, and derivatives thereof can be used as the photocurable resin.

However, the arrangement of the liquid crystal display device disclosed by Japanese Laid-Open Publication No. 10-186330 described above has, for example, the following disadvantages: 1) the use of the photocurable resin increases cost; 2) the number of steps of fabricating the liquid crystal display device is increased since the alignment fixing layer is provided by curing the photocurable resin by illuminating with ultraviolet light while the liquid crystal molecules are kept axially symmetrically aligned in the presence of applied voltage across the liquid crystal layer; and 3) the ultraviolet light used for fixing the alignment of the liquid crystal molecules partially decomposes the liquid crystal material, causing reduction in a voltage retaining ratio, thereby resulting in deterioration of image display reliability (e.g. image sticking).

On the other hand, unless the alignment fixing layer is provided, there occurs a problem that a response time is slow.

SUMMARY OF THE INVENTION

A liquid crystal display device according to the present invention includes a first substrate, a second substrate, and a liquid crystal layer interposed between the first and second substrates. The first substrate includes a protrusion structure and a vertical alignment layer each facing the liquid crystal layer. The liquid crystal layer includes a plurality of liquid crystal regions separated from each other by the protrusion structure. Liquid crystal molecules in the plurality of liquid crystal regions are aligned axially symmetrically around an axis perpendicular to a surface of the second substrate at least in the presence of applied voltage. Each of the plurality of liquid crystal regions has a size such that each of the plurality of liquid crystal regions is included within a circular area circumscribing a square of approximately 70 μm or less.

In one embodiment of the invention, the plurality of liquid crystal regions are contained in a single pixel region.

In one embodiment of the invention, the protrusion structure is arranged in a grid pattern.

In one embodiment of the invention, the protrusion structure is arranged in a checkered pattern.

In one embodiment of the invention, the liquid crystal regions surrounded by the protrusion structure are polygons.

In one embodiment of the invention, the liquid crystal regions surrounded by the protrusion structure are polygons of different sizes, and are regularly arranged.

In one embodiment of the invention, the protrusion structure is made of a transparent material.

In one embodiment of the invention, a height of the protrusion structure is approximately 2 μm or less.

In one embodiment of the invention, a response time is approximately 60 ms or less.

In one embodiment of the invention, the liquid crystal regions surrounded by the protrusion structure are squares.

In one embodiment of the invention, the second substrate is a plasma cell. The second substrate includes a plate, a dielectric sheet, ribs and discharge channels. The discharge channels are arranged in rows and each discharge channel is surrounded by the ribs interposed between the plate and the dielectric sheet. The protrusion structure is provided between the first substrate and the dielectric sheet.

Hereinafter, functions of the present invention will be described.

In the liquid crystal display device of the present invention, the size of each liquid crystal region separated by the protrusion structure provided in the substrate is a size such that each liquid crystal region is included within a circular area circumscribing a square of approximately 70 μm or less. Therefore, stable axially symmetric alignment can be established in each liquid crystal region, and a sufficiently high response speed (sufficiently short response time), e.g., approximately 60 ms or less, is obtained. Furthermore, in the case where the above size is a size such that each liquid crystal region is included within a circular area circumscribing a square of approximately 50 μm or less, a higher response speed, e.g., approximately 55 ms or less, is obtained.

A pixel region may contain a plurality of liquid crystal regions separated from each other by the protrusion structure, whereby the liquid crystal display device of the present invention can have large pixel regions. Furthermore, the modification of the shape and size of the protrusion structure can lead to change in the size of the liquid crystal region.

The protrusion structure may be arranged in a grid pattern or in a checkered pattern, whereby a high aperture ratio can be obtained.

The regions surrounded by the protrusion structure may be polygons having different sizes and the polygons are regularly arranged, whereby the aperture ratio can be greater than that of a grid or checkered pattern.

The protrusion structure may be made of a transparent material, whereby light passes through the protrusion structure to the liquid crystal layer, contributing to an increase in the transmittance of the whole liquid crystal layer.

The height of the protrusion structure may be approximately 2 $\mu$m or less, more preferably about 1 $\mu$m or less, whereby the liquid crystal layer in a region interposed between the protrusion structure and the counter substrate (not the liquid crystal region) has nearly the same thickness as that of the region surrounded by the protrusion structure. Therefore, the display characteristics of both regions are close to each other.

It is not necessary to restrict the type of a drive element in the liquid crystal display device of the present invention. In the case where a plasma generating substrate is adopted, however, significant effects can be realized in a large liquid crystal display device.

Thus, the invention disclosed herein makes possible the advantage of providing a liquid crystal display device in which liquid crystal molecules are stabilized without any alignment fixing layer, and a sufficient response speed is obtained.

These and other advantages of the present invention will become apparent to those skilled in the art upon reading and understanding the following detailed description with reference to the accompanying figures.

DESCRIPTION OF THE PREFERRED EMBODIMENTS

Hereinafter, specific but not-limiting examples of the present invention will be described with reference to the accompanying drawings.

(Basic Operation)

Figure 3A:
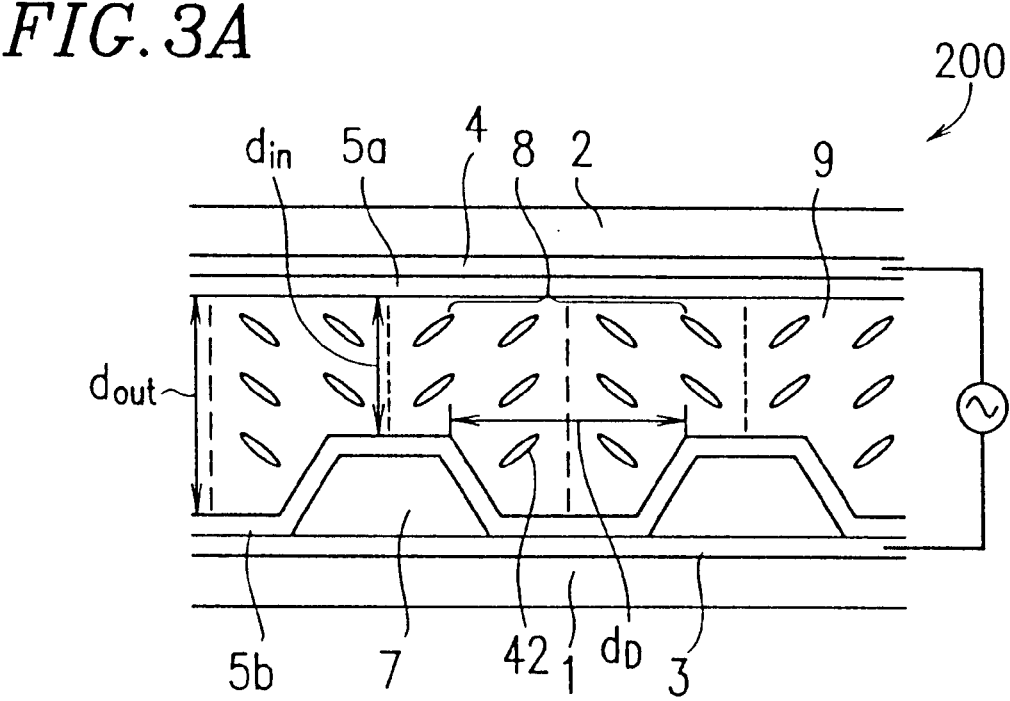
FIG. 3A illustrates an operational principle of a liquid crystal display device according to the present invention in the presence of applied voltage.
Figure 3B:
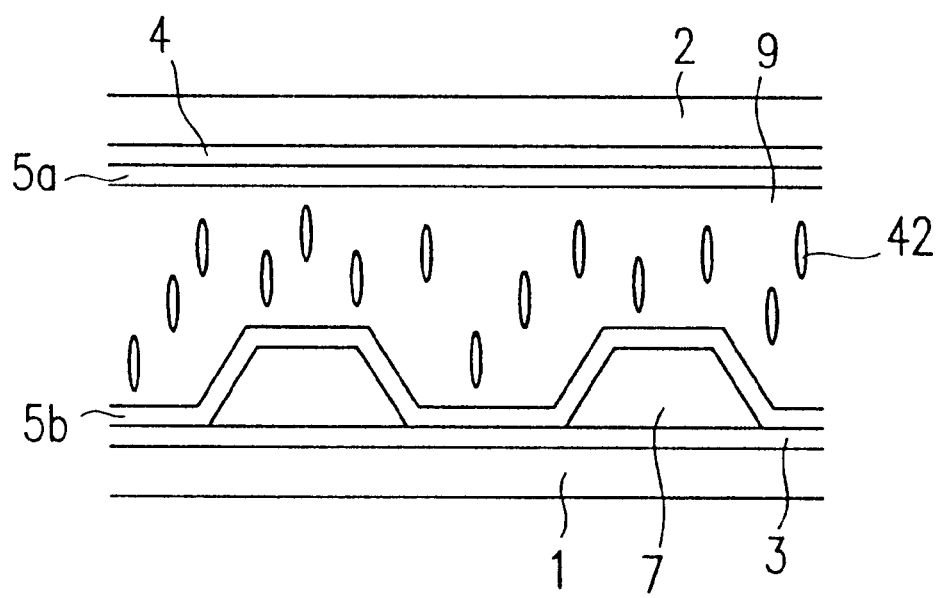
FIG. 3B illustrates an operational principle of a liquid crystal display device according to the present invention in the absence of applied voltage.

A liquid crystal display device 200 according to the present invention will be described with reference to FIGS. 3A and 3B. FIGS. 3A and 3B illustrate cross-sectional views of the liquid crystal display device 200 in the presence of a voltage for gray scale display and in the absence of applied voltage, respectively.

The liquid crystal display device 200 has, for example, the following arrangement. A liquid crystal layer 9 having negative (n type) dielectric anisotropy ($\Delta\in$) is held between first and second plates 1 and 2. A signal electrode 3 and a scanning electrode 4 are provided on the first and second plates 1 and 2 for applying a voltage across the liquid crystal layer 9, respectively. The signal electrode 3 on the first plate 1 and the scanning electrode 4 on the second plate 2 intersect with each other. A pixel region is formed at the intersection of the signal electrode 3 and the scanning electrode 4. Vertical alignment layers 5$b$ and 5$a$ are formed on the first and second plates 1 and 2, respectively, so as to cover the signal electrode 3 and the scanning electrode 4.

A protrusion structure 7 is formed at least either on the signal electrode 3 or on the scanning electrode 4. The protrusion structure 7 is also covered with the vertical alignment layer 5$b$ or 5$a$. By providing the protrusion structure 7, the liquid crystal layer 9 has two different thicknesses $d_{out}$ and $d_{in}$. As described below, a liquid crystal region (domain) surrounded by the protrusion structure 7 is defined. The liquid crystal region has a width of $d_D$. In the liquid crystal region, liquid crystal molecules 42 are axially symmetrically aligned in the presence of applied voltage. It should be noted that the signal electrode 3 may be formed over the protrusion structure 7 (and below the vertical alignment layer 5$a$).

A first substrate includes the first plate 1, the signal electrode 3, the protrusion structure 7, and the vertical alignment layer 5$b$. A second substrate includes the second plate 2, the scanning electrode 4, and the vertical alignment layer 5$a$.

Liquid crystal molecules 42 are aligned along a direction perpendicular to the plates 1 and 2 by an alignment force (anchoring force) of the vertical alignment layers 5$a$ and 5$b$ in the absence of applied voltage. When applying a voltage across the liquid crystal layer 9, the liquid crystal molecules 42 having negative dielectric anisotropy are forced to redirect their longitudinal axes in a direction perpendicular to the direction of applied electric field, resulting in the molecule 42 tilting toward a direction parallel to the plates 1 and 2 (gray scale display state) as shown in FIG. 3A. At this time, the liquid crystal molecules 42 are axially symmetrically aligned by the protrusion structure 7.

Although it is not necessarily required to restrict the type of a drive element in the liquid crystal display device of the present invention, significant effects can be realized in a large liquid crystal display device incorporating a plasma generating substrate.

(Protrusion Structure)

Figure 2A:
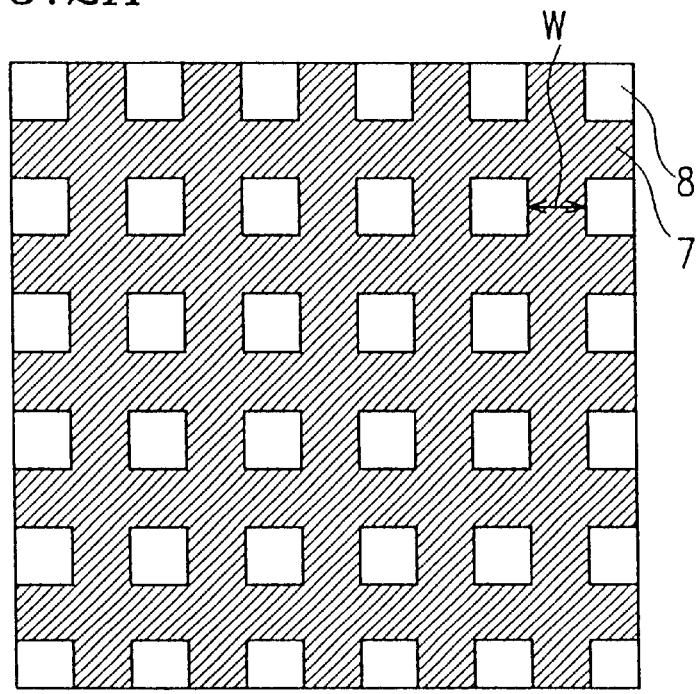
FIGS. 2A through 2E illustrate exemplary patterns of a protrusion structure and liquid crystal regions in the present invention.
Figure 2B:
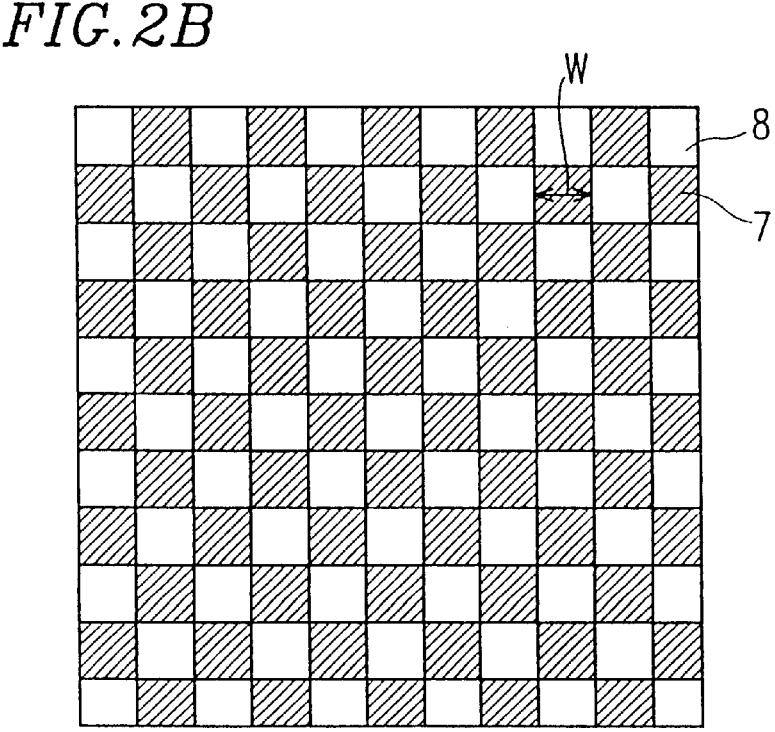

In the liquid crystal display device of the present invention, the protrusion structure 7 is provided so that a single pixel region contains a plurality of liquid crystal regions 8. The protrusion structure 7 is, for example, regularly arranged in a grid pattern as shown in FIG. 2A. Regions surrounded by the protrusion structure 7 are the liquid crystal regions 8. A plurality of liquid crystal regions 8 are present in the single pixel region. The protrusion structure 7 may be arranged in a checkered pattern as shown in FIG. 2B instead of the grid pattern in FIG. 2A. The protrusion structure 7 may be contiguous in a pattern as shown in FIG.

2C. The protrusion structure 7 may be in a non-contiguous pattern as shown in FIG. 2D. The protrusion structure 7 may be formed of quadrangles while the liquid crystal regions 8 are quadrangles of two different sizes in a checkered pattern as shown in FIG. 2E. The shapes of the protrusion structure 7 and the liquid crystal regions 8 are not limited to quadrangles, but may be other polygons.

The protrusion structure 7 is formed so that the liquid crystal region 8 has a size such that the liquid crystal region 8 is included within a circular area circumscribing a square of approximately 70 µm or less, more preferably approximately 50 µm or less.

The sectional shape of the protrusion structure 7 may be a polygon such as a rectangle, or a semicircle or a trapezoid, instead of a square.

In the liquid crystal display device of the present invention, the size and position of the liquid crystal regions 8 can be adjusted by the arrangement of the protrusion structure 7. A sufficient number of the liquid crystal regions 8 can be contained in a single pixel region. Therefore, the orientations of the liquid crystal molecules are macroscopically averaged in the entirety of liquid crystal panel, whereby transmittance in various viewing directions is substantially symmetrical. That is, refraction index anisotropy is averaged. Therefore, the transmittance does not depend on the viewing angle, thereby improving the quality of images displayed by the liquid crystal display device. The size of the liquid crystal region 8 can be sufficiently reduced down to below the resolution which the human eye can recognize. Therefore, images without unevenness can be obtained, thereby improving the quality of images displayed by the liquid crystal display device.

In the liquid crystal display device of the present invention, since the size of the liquid crystal region 8 surrounded by the protrusion structure 7 is a size such that the liquid crystal region 8 is included within a circular area circumscribing a square of approximately 70 µm or less, a sufficient response speed is obtained. In the case where the size of the liquid crystal region 8 is a size such that the liquid crystal region 8 is included within a circular area circumscribing a square of approximately 50 µm or less, a more sufficient response speed is obtained.

Figure 7:
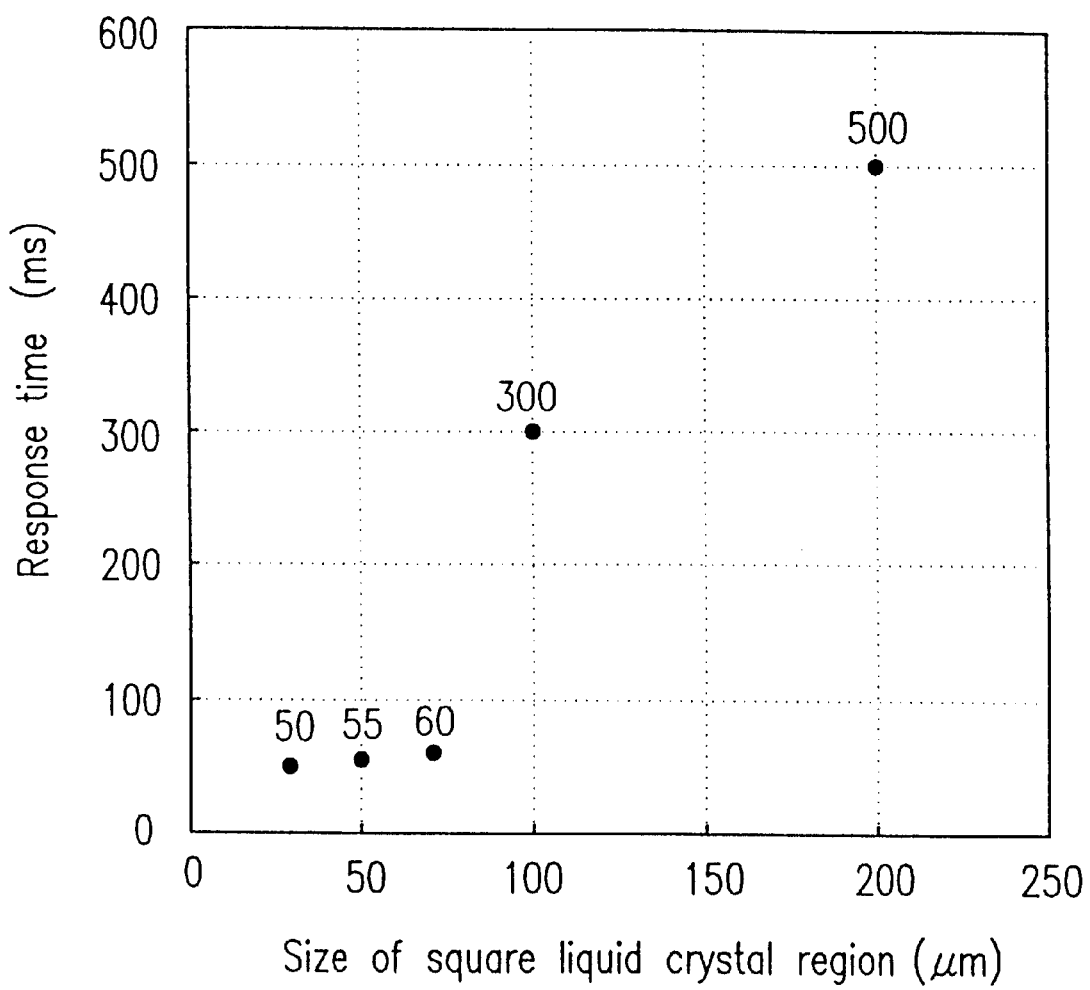
FIG. 7 is a graph illustrating the relationship between the size of a square liquid crystal region and the response time.

FIG. 7 is a graph illustrating the relationship between the size and response time of the liquid crystal region 8. A liquid crystal material used in the measurement for FIG. 7 has the following physical properties: $\Delta n=0.08$; $\epsilon_{//}=3.3$; $\epsilon_{\perp}=6.0$; viscosity=20 mm²/s; and $K_{22}/K_{11}=1.2$. The vertical alignment layer is made of JALS-945 (Japan Synthetic Rubber Co., Ltd.). An applied voltage is 7.0 V. The temperature is 25° C. upon the measurement. The liquid crystal region is in the shape of a square. The cell gap is approximately 6 µm.

When the protrusion structure 7 is present as in the liquid crystal display device of the present invention, the liquid crystal molecules tilt toward a direction substantially parallel to the substrates in the presence of applied voltage. Of the molecules in the liquid crystal region 8 surrounded by the protrusion structure 7, the nearer the molecule is the protrusion structure 7, the sooner the tilting direction thereof is established. It takes more time for the molecules in the central portion of the liquid crystal region 8 to have their tilting direction established.

Accordingly, a smaller size of the liquid crystal region 8 reduces the time (i.e., response time) of the liquid crystal molecules tilting successively from the vicinity of the protrusion structure 7 to the central portion of the liquid crystal region 8, thereby making it possible to obtain a sufficient response speed (time) as shown in FIG. 7.

From FIG. 7, a sufficient response speed (time) can be obtained when a size of the square liquid crystal region (i.e., a length of one side of the square liquid crystal region) is about 70 µm or less. It should be noted that the similar desirable result (sufficient response speed) can be also obtained when each of liquid crystal regions has such a size that the liquid crystal region is included within a circular area circumscribing a square of approximately 70 µm or less. In such a case, each of the liquid crystal regions can have a different shape other than a square, for example, a polygon.

The width of the protrusion structure 7 is significantly affects the aperture ratio. In terms of the aperture ratio, the width of the protrusion structure 7 is preferably as narrow as possible while the liquid crystal region 8 is preferably as large as possible. However, when the liquid crystal region 8 is large, a sufficient response speed as shown in FIG. 7 cannot be obtained.

The minimal width of the protrusion structure 7 is defined depending on a fabricating process thereof. In an example where the lower limit of the width of the protrusion structure 7 is approximately 50 µm and the size of the liquid crystal region 8 is a size such that the liquid crystal region 8 is included within a circular area circumscribing a square of approximately 50 µm, the aperture ratio is approximately 25% when the protrusion structure 7 is arranged in a grid pattern as shown in FIG. 2A, and approximately 50% when in a checkered pattern as shown in FIG. 2B. Therefore, under such conditions, it is more preferable to arrange the protrusion structure 7 in a checkered pattern as shown in FIG. 2B.

Figure 2C:
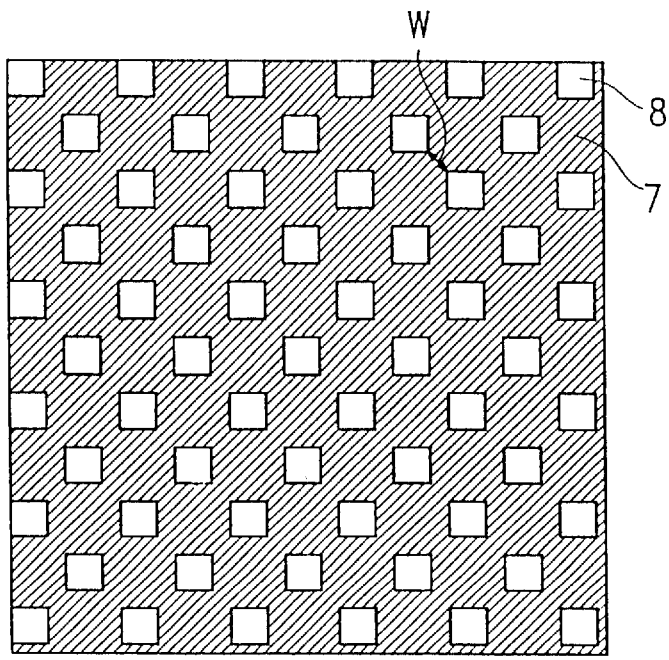
Figure 2D:
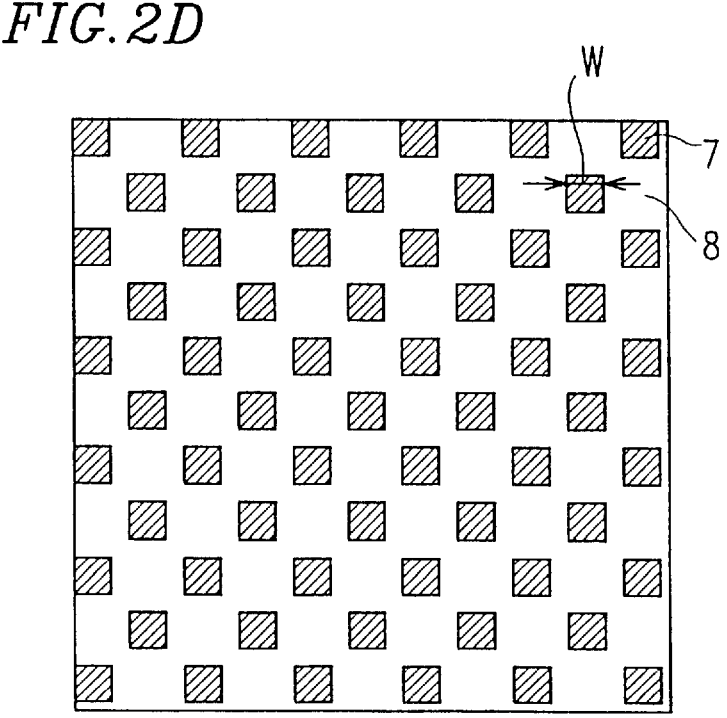
Figure 2E:
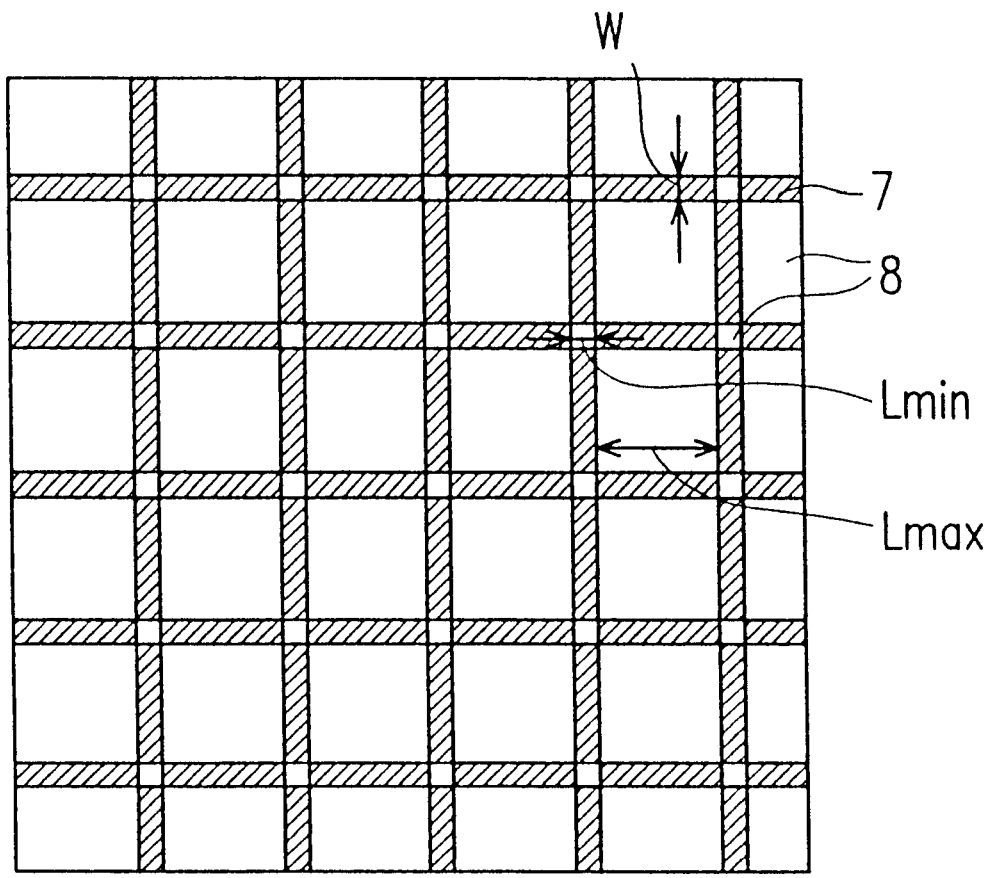

In another example where the minimal width W of the protrusion structure 7 is approximately 60 µm and the size of the liquid crystal region 8 is a size such that the liquid crystal region 8 is included within a circular area circumscribing a square of approximately 50 µm, the arrangement as shown in FIG. 2C is preferable. In still another example where the minimal width W of the protrusion structure 7 is approximately 40 µm and the liquid crystal region 8 has a size such that the liquid crystal region 8 is included within a circular area circumscribing a square of approximately 50 µm, the arrangement as shown in FIG. 2D is preferable. In still another example where the minimal width W of the protrusion structure 7 is approximately 10 µm and the liquid crystal region 8 has a size such that the liquid crystal region 8 is included within a circular area circumscribing a square of approximately 50 µm, the checkered arrangement as shown in FIG. 2E is preferable.

In the case where the ratio of the width of the aperture and the width W of the protrusion structure 7 (in FIG. 2E, the ratio of the length Lmax of the side of the larger liquid crystal region 8 to the length Lmin of the side of the smaller liquid crystal region 8) is 3:1, the arrangement in a grid pattern as shown in FIG. 2A provides only an aperture ratio of 56.25%, whereas the checkered arrangement as shown in FIG. 2E provides an aperture ratio of 62.5%.

As described above, the optimum arrangement of the protrusion structure 7 is preferably defined by a desirable width of the protrusion structure 7 and a desirable size of the liquid crystal region 8.

The height of the protrusion structure 7 is preferably about 2 µm, more preferably about 1 µm. It is because a region of the liquid crystal layer interposed between the protrusion structure 7 and the second plate 2 (in FIG. 3A, a region which is not the liquid crystal region 8) has nearly the same thickness as that of the liquid crystal region 8, whereby the display characteristics of both regions are substantially the same.

The protrusion structure 7 is preferably made of a transparent material for the following reason. Light is transmitted through a region of the liquid crystal layer interposed between the protrusion structure 7 and the second plate 2 (in FIG. 3A, a region which is not the liquid crystal region 8), contributing to an increase in the transmittance of the whole liquid crystal layer.

(Substrate)

In an active matrix liquid crystal display device in which the switching of each pixel is controlled using a thin-film transistor (TFT) as a switching element, the protrusion structure 7 may be provided in a substrate having pixel electrodes, TFTs and wires thereon. Alternatively, the protrusion structure 7 may be provided in a counter substrate having counter electrodes and an optional color filter thereon. In a plasma addressed liquid crystal display device, the protrusion structure 7 may be provided on a surface of a dielectric sheet contacting the liquid crystal layer.

The liquid crystal display device of the present invention is not of a display mode in which liquid crystal molecules are aligned in a single direction. Therefore, it is not required in the fabrication process to rub the alignment layers on the substrates. In the display mode of the liquid crystal display device of the present invention, the formation of the vertical alignment layer 5b on the protrusion structure 7 poses a problem that the material of the vertical alignment layer 5b is repelled by the protrusion structure 7, whereby it is not possible to satisfactorily coat the protrusion structure 7 with the material for the vertical alignment layer 5b. In this case, the problem is effectively avoided by performing surface treatment after the protrusion structure 7 is formed on the substrate. Specifically, for example, a surface portion of the substrate having the protrusion structure 7 is reformed by silane coupling. Alternatively, the surface portion is removed by dry etching.

(Liquid Crystal Material)

The liquid crystal display device of the present invention is a vertical aligned type. Accordingly, a liquid crystal material used in the liquid crystal display device of the present invention is a so-called n-type liquid crystal material having negative dielectric anisotropy ($\Delta\epsilon<0$) in which liquid crystal molecules are tilted in a direction perpendicular to the direction of electric field in the presence of applied voltage. The absolute value of $\Delta\epsilon$ is appropriately set according to applications. Generally, for the purpose of reducing a driving voltage, $\Delta\epsilon$ preferably has a large absolute value.

(Vertical Alignment Layer)

The material of the vertical alignment layer can be either inorganic or organic as long as the layer has a surface for causing liquid crystal molecules to be vertically aligned. Examples of usable materials include polyimides (JALS-204 (Japan Synthetic Rubber Co., Ltd.) or 1211 (Nissan Chemical Industries, Ltd.)), inorganic materials (EXP-OA003 (Nissan Chemical Industries, Ltd.)), and the like.

EXAMPLES

Examples of the present invention will be described below.

EXAMPLE 1

Figure 1A:
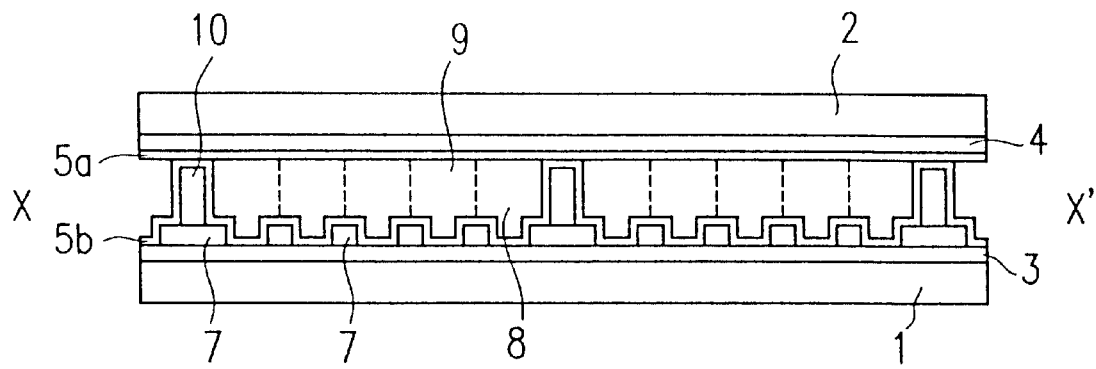
FIG. 1A illustrates a cross-sectional view of a liquid crystal display device according to Example 1of the present invention.
Figure 1B:
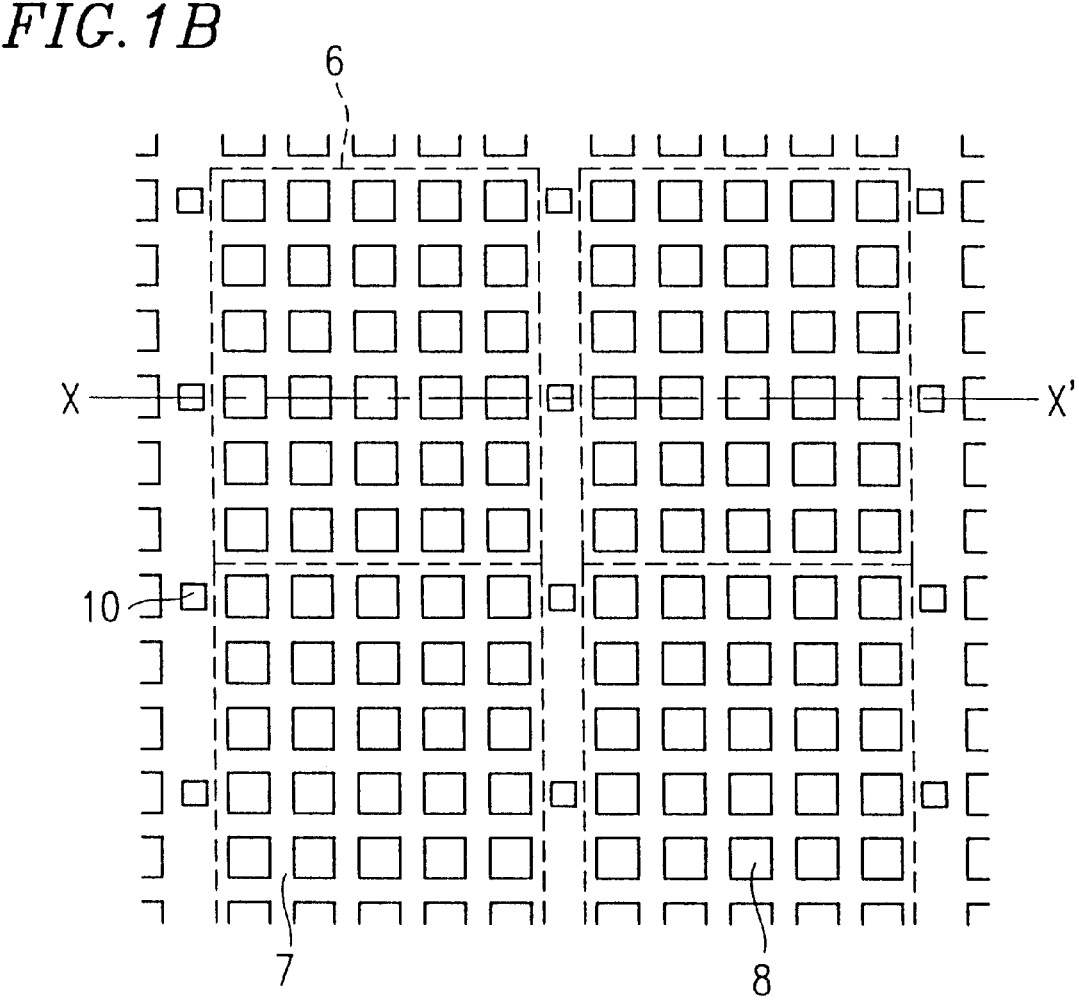
FIG. 1B illustrates a top plan view of a liquid crystal display device according to Example 1 of the present invention.

A method for fabricating a liquid crystal display device of the present invention will be described with reference to FIGS. 1A and 1B. FIG. 1B is a schematic top plan view illustrating a specific structure of a liquid crystal display device according to Example 1 of the present invention. FIG. 1A is a cross-sectional view of the liquid crystal display device taken along a line X–X' of FIG. 1B.

Transparent scanning electrodes 4 made of indium tin oxide (ITO) are formed in a striped pattern on a second plate 2 made of glass or the like. Then, a vertical alignment layer 5a is formed of polyimide (JALS-945 (Japan Chemical Rubber Co., Ltd.)) on the second plate 2 so as to cover the electrodes 4.

Transparent signal electrodes 3 made of ITO are formed in a striped pattern on a first plate 1 made of glass or the like, and the electrodes 3 are then coated with a photosensitive resin. By patterning the photosensitive resin with a photomask, the protrusion structure 7 approximately 2 $\mu$m high and approximately 20 $\mu$m wide is formed on the electrodes 3. The protrusion structure 7 is patterned so that liquid crystal regions 8 surrounded by the protrusion structure 7 are regularly arranged and the liquid crystal region has a size such that the liquid crystal region is included within a circular area circumscribing a square of approximately 50 $\mu$m. The signal electrodes 3 on the first plate 1 and the scanning electrodes 4 on the second plate 2 intersect with each other. A pixel region 6 is formed at the intersection of each signal electrode 3 and each scanning electrode 4.

A color filter (not shown) and a black matrix (not shown) are optionally formed on the surface of the first plate 1 facing a liquid crystal layer 9. In this case, the signal electrodes 3 are formed thereon in a striped pattern. The color filter includes colored layers having different colors (e.g., red, green, blue) for each pixel. The black matrix is formed between each colored layer of the color filter.

The protrusion structure 7 is coated with a photosensitive resin. By patterning the photosensitive resin with a photomask, spacers 10 approximately 4 $\mu$m high are formed at predetermined positions on the protrusion structure 7. A vertical alignment layer 5b is formed of polyimide (JALS-945 (Japan Chemical Rubber Co., Ltd.)) on the first plate 1 so as to cover the elements formed thereon.

Both the first and second substrates are adhered together. An n-type liquid crystal material ($\Delta\epsilon=-2.7$; $\Delta n=0.079$; the twist angle inherent in the liquid crystal material is set to be 90° twist at a cell gap of 6 $\mu$m) is injected into a gap between the first and second substrates to form the liquid crystal layer 9 in which liquid crystal regions 8 are surrounded by the protrusion structure 7. Thus, a liquid crystal cell is produced.

Photosensitive acryls, methacrylates, polyimides, or rubbers may be used for the protrusion structure 7 and the spacers 10. Any material which has photosensitivity and a strength to withstand a pressure of writing (4009/$\phi$) can be used.

Polarizing plates are provided in the crossed Nicols state so as interpose the liquid crystal cell. Thus, the liquid crystal display device of the present invention is completed.

In the liquid crystal display device of Example 1, as shown in FIG. 1B, the single pixel region 6 contains 30 liquid crystal regions 8 surrounded by the protrusion structure 7 (for example, when the size of the liquid crystal region 8 is approximately 70 $\mu$m×70 $\mu$m, the size of the single pixel region is approximately (5×70 $\mu$m)×(6×70 $\mu$m)).

Figure 4:
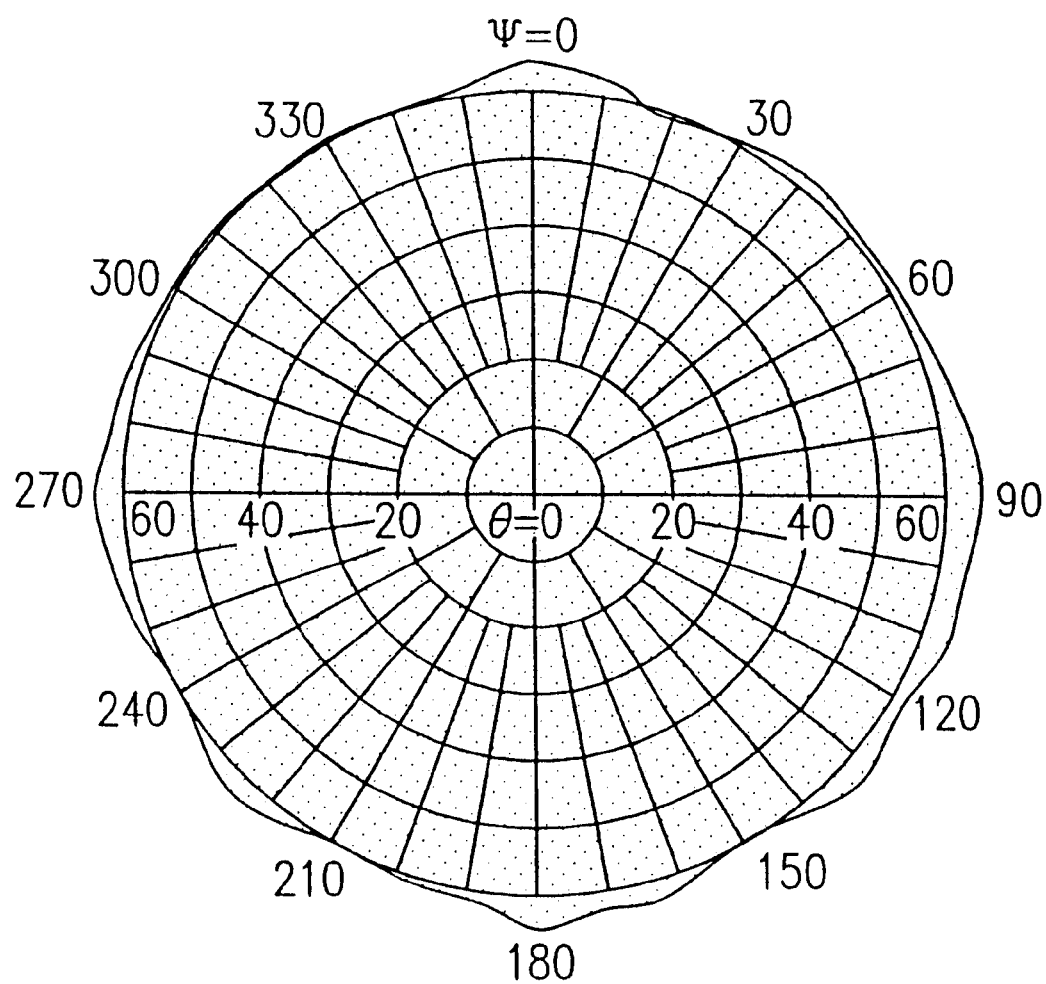
FIG. 4 illustrates viewing angle characteristics of the liquid crystal display device according to Example 1 of the present invention.

FIG. 4 illustrates dependency of contrast on the viewing angle of the liquid crystal display device according to Example 1. In FIG. 4, $\psi$ denotes the azimuth (angle in a display plane), $\theta$ denotes the viewing angle (angle with respect to a direction normal to the display plane), and the hatched area represents an area where the contrast ratio is 10:1 or greater. As is seen in FIG. 4, a high contrast ratio is obtained over a wide viewing angle.

EXAMPLE 2

Figure 5:
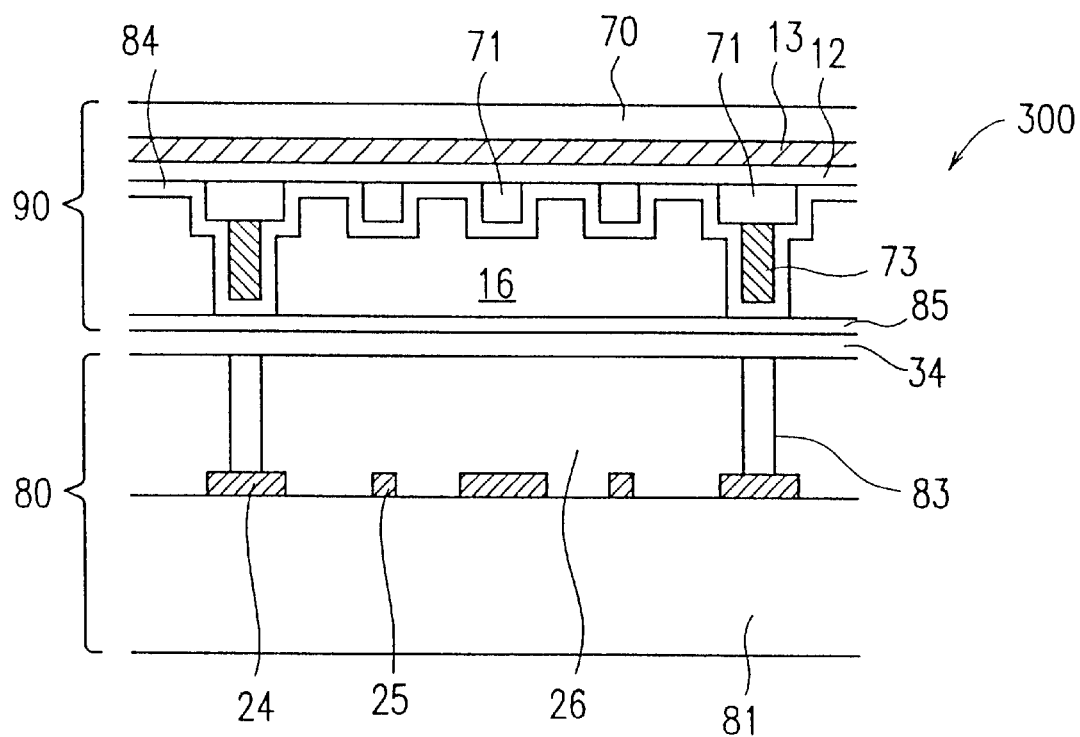
FIG. 5 illustrates a cross-sectional view of a liquid crystal display device according to Example 2 of the present invention.
Figure 6A:
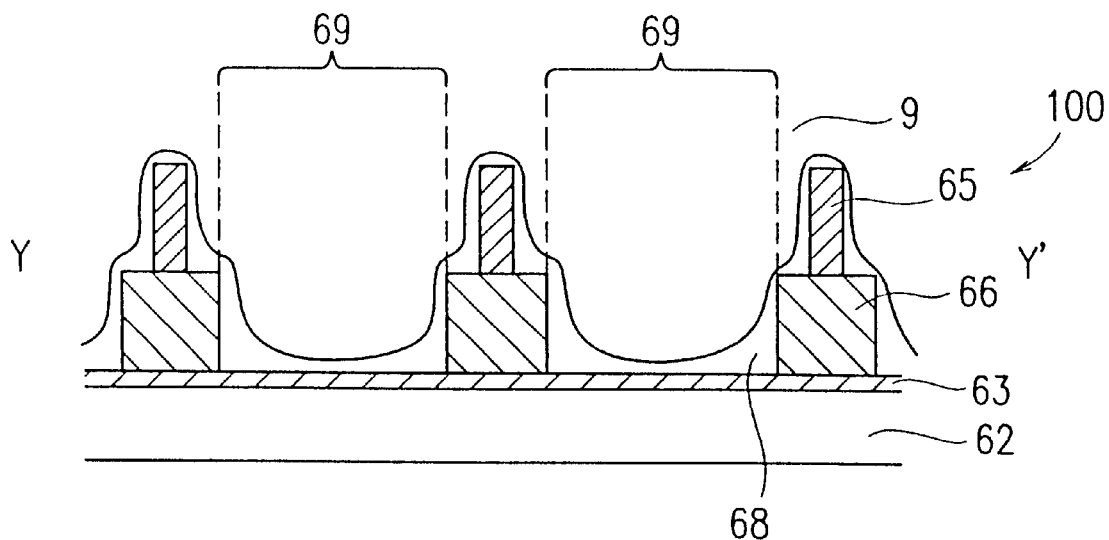
FIGS. 6A and 6B illustrate, respectively, a partial cross-sectional view and a top plan view of a conventional liquid crystal display device with a wide viewing angle.
Figure 6B:
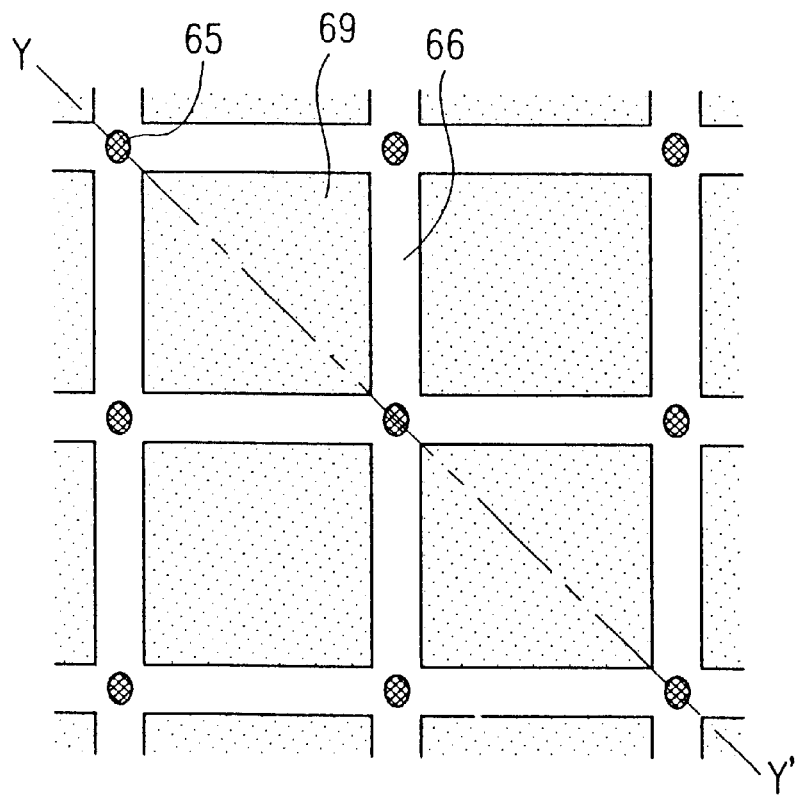

FIG. 5 is a partial cross-sectional view of a plasma addressed liquid crystal display device 300 including a plasma generating cell as a drive element.

The plasma addressed liquid crystal display device 300 has a flat panel structure, including a display cell 90 for displaying images by modulating incident light according to pixel signals, and a plasma cell 80 (second substrate) mating with the display cell 90 (first substrate) for scanning (addressing) the display cell 90. The plasma cell 80 has discharge channels 26 (only one is shown in FIG. 5) arranged in rows. Theplasma cell 80 sequentially generates plasma discharge, and progressively scan the display cell 90 row by row.

The discharge channels 26 include ribs 83 for forming spaces arranged in rows, anode electrodes 24 provided under the ribs 83, and cathode electrodes 25 provided within the spaces at an intermediate position between the anode electrodes 24. The anode electrode 24 and the cathode electrode 25 have opposite polarities to each other, defining a physical aperture therebetween. Each of the spaces arranged in rows formed by the ribs 83 contains gas sealed therein for generating plasma. A dieletric sheet 34 and a plate 81 are spaced a predetermined distance apart by the ribs 83. The dielectric sheet 34 is, for example, made of a thin-plate glass (e.g., approximately 50 $\mu$m thick). Light entering the liquid crystal display device 300 passes only through the physical aperture. The display cell 90 has signal electrodes 12 arranged in columns. A pixel is formed at the intersection of the signal electrode 12 and the discharge channel 26. An image signal is applied to the signal electrode 12 in synchronization with progressive scanning performed row by row, thereby modulating incident light on a pixel-by-pixel basis.

The display cell 90 and the plasma cell 80 are separated by the dielectric sheet 34. The plasma cell 80 includes the dielectric sheet 34 and the glass plate 81 under the sheet 34. The display cell 90 includes the dielectric sheet 34 and a glass plate 70 over the sheet 34. A liquid crystal material 16 as a display medium is held between the glass plate 70 and the dielectric sheet 34. A color filter 13 and the signal electrodes 12 made of a transparent material such as, for example, ITO are successively formed in this order on the internal surface of the glass plate 70. A protrusion structure 71 is provided on the signal electrodes 12 in a predetermined pattern as shown in FIGS. 2A through 2E. A vertical alignment layer 84 is provided on the surface of the plate 70 so as to cover the electrodes 12, the protrusion structure 71, and spacer 73. A vertical alignment layer 85 is formed on a surface of the dielectric sheet 34 facing the liquid crystal material 16.

In Example 2 shown in FIG. 5, the protrusion structure 71 and the vertical alignment layer 84 are formed on the plate 70 since it is difficult to form the protrusion structure 71 and the vertical alignment layer 84 on a surface of the dielectric sheet 34 facing the liquid crystal material 16. The present invention is not limited to this exemplary structure. The protrusion structure 71 and the vertical alignment layer 84 may be provided on the surface of the dielectric sheet 34 facing the liquid crystal material 16.

In the plasma addressed liquid crystal display device 300, the plasma spaces of the plasma generating cell 80 arranged in rows separated from each other by the ribs 83 serve as a drive electrode. Therefore, a wire for driving the liquid crystal molecules may be provided on the plate 70 only along a direction intersecting with the plasma spaces arranged in rows.

In the liquid crystal display device of Example 2, a high contrast, response speed and image display reliability (less image sticking) are obtained over a wide viewing angle. A plasma addressed liquid crystal display device is suitable for a large screen. The liquid crystal display device incorporates the plasma generating substrate, whereby a large liquid crystal display device with high quality of images can be provided.

As described above, a plurality of liquid crystal regions are separated by the protrusion structure provided in the substrate, each region having a size such that each region is included within a circular area circumscribing a square of approximately 70 $\mu$m or less. Therefore, a sufficient response speed can be realized without any alignment fixing layer.

The protrusion structure can be arranged so that the liquid crystal regions having a desired size are formed in a single pixel. In an embodiment of the present invention where the protrusion structure is made of a transparent material, light passes through the protrusion structure to the liquid crystal layer, contributing to an increase in the transmittance of the whole liquid crystal layer.

In the liquid crystal display device of the present invention, when the plasma generating substrate is incorporated therein, a large liquid crystal display device can be provided with high quality of images.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
    a first substrate;
    a second substrate; and
    a liquid crystal layer substantially free of photocurable resin interposed between the first and second substrates,
    wherein:
        the first substrate includes a protrusion structure and a vertical alignment layer each facing the liquid crystal layer,
        the liquid crystal layer includes a plurality of liquid crystal regions separated from each other by the protrusion structure, and
        liquid crystal molecules in the plurality of liquid crystal regions are aligned axially symmetrically around an axis perpendicular to a surface of the second substrate at least in the presence of applied voltage, each of the plurality of liquid crystal regions having a size such that each of the plurality of liquid crystal regions is included within a circular area circumscribing a square of approximately 70 $\mu$m or less.

2. A liquid crystal display device according to claim 1, wherein the plurality of liquid crystal regions are contained in a single pixel region.

3. A liquid crystal display device according to claim 1, wherein the protrusion structure is arranged in a grid pattern.

4. A liquid crystal display device according to claim 1, wherein the protrusion structure is arranged in a checkered pattern.

5. A liquid crystal display device according to claim 1, wherein the liquid crystal regions surrounded by the protrusion structure are polygons.

6. A liquid crystal display device according to claim 1, wherein the liquid crystal regions surrounded by the protrusion structure are polygons of different sizes, and are regularly arranged.

7. A liquid crystal display device according to claim 1, wherein the protrusion structure is made of a transparent material.

8. A liquid crystal display device according to claim 1, wherein a height of the protrusion structure is approximately 2 μm or less.

9. A liquid crystal display device according to claim 1, wherein a response time is approximately 60 ms or less.

10. A liquid crystal display device according to claim 1, wherein the liquid crystal regions surrounded by the protrusion structure are squares.

11. A liquid crystal display device according to claim 1, wherein:
   the second substrate is a plasma cell, the second substrate including a plate, a dielectric sheet, ribs and discharge channels, the discharge channels being arranged in rows and each discharge channel being surrounded by the ribs interposed between the plate and the dielectric sheet, and
   the protrusion structure is provided between the first substrate and the dielectric sheet.

12. A liquid crystal display device comprising:
   a first substrate;
   a second substrate; and
   a liquid crystal layer interposed between the first and second substrates,
   wherein:
      the first substrate includes a protrusion structure and a vertical alignment layer each facing the liquid crystal layer,
      the liquid crystal layer includes a plurality of liquid crystal regions separated from each other by the protrusion structure,
      liquid crystal molecules in the plurality of liquid crystal regions are aligned axially symmetrically around an axis perpendicular to a surface of the second substrate at least in the presence of applied voltage, each of the plurality of liquid crystal regions having a size such that each of the plurality of liquid crystal regions is included within a circular area circumscribing a square of approximately 70 μm or less, and
      the plurality of liquid crystal regions are contained in a single pixel region.

13. A liquid crystal display device comprising:
   a first substrate;
   a second substrate; and
   a liquid crystal layer interposed between the first and second substrates,
   wherein:
      the first substrate includes a protrusion structure and a vertical alignment layer each facing the liquid crystal layer,
      the liquid crystal layer includes a plurality of liquid crystal regions separated from each other by the protrusion structure, and
      liquid crystal molecules in the plurality of liquid crystal regions are aligned axially symmetrically around an axis perpendicular to a surface of the second substrate at least in the presence of applied voltage, each of the plurality of liquid crystal regions having a size such that each of the plurality of liquid crystal regions is included within a circular area circumscribing a square of approximately 70 μm or less, and
      the protrusion structure is arranged in a checkered pattern.

14. A liquid crystal display device comprising:
   a first substrate;
   a second substrate; and
   a liquid crystal layer interposed between the first and second substrates,
   wherein:
      the first substrate includes a protrusion structure and a vertical alignment layer each facing the liquid crystal layer,
      the liquid crystal layer includes a plurality of liquid crystal regions separated from each other by the protrusion structure, and
      liquid crystal molecules in the plurality of liquid crystal regions are aligned axially symmetrically around an axis perpendicular to a surface of the second substrate at least in the presence of applied voltage, each of the plurality of liquid crystal regions having a size such that each of the plurality of liquid crystal regions is included within a circular area circumscribing a square of approximately 70 μm or less, and
      the liquid crystal regions surrounded by the protrusion structure are polygons of different sizes, and are regularly arranged.

15. A liquid crystal display device comprising:
   a first substrate;
   a second substrate; and
   a liquid crystal layer interposed between the first and second substrates,
   wherein:
      the first substrate includes a protrusion structure and a vertical alignment layer each facing the liquid crystal layer,
      the liquid crystal layer includes a plurality of liquid crystal regions in a pixel separated from each other by the protrusion structure so that the pixel includes the plurality of liquid crystal regions, and
      liquid crystal molecules in each of the plurality of liquid crystal regions are aligned axially symmetrically around an axis perpendicular to a surface of the second substrate at least in the presence of applied voltage, each of the plurality of liquid crystal regions having a size such that each of the plurality of liquid crystal regions is included within a corresponding circular area circumscribing a square of approximately 70 μm or less.

16. The device of claim 1, wherein liquid crystal molecules of the liquid crystal layer are stabilized without any alignment fixing layer.

* * * * *